Oct. 13, 1942.  E. J. ALDERMAN ET AL  2,298,267

HYDRAULIC CONTROL MECHANISM

Filed May 15, 1940  2 Sheets-Sheet 1

Inventors
Edward J. Alderman
Donald F. White
By G. J. Kessenich & J. H. Church
Attorneys Oct. 13, 1942.  E. J. ALDERMAN ET AL  2,298,267
HYDRAULIC CONTROL MECHANISM
Filed May 15, 1940   2 Sheets-Sheet 2
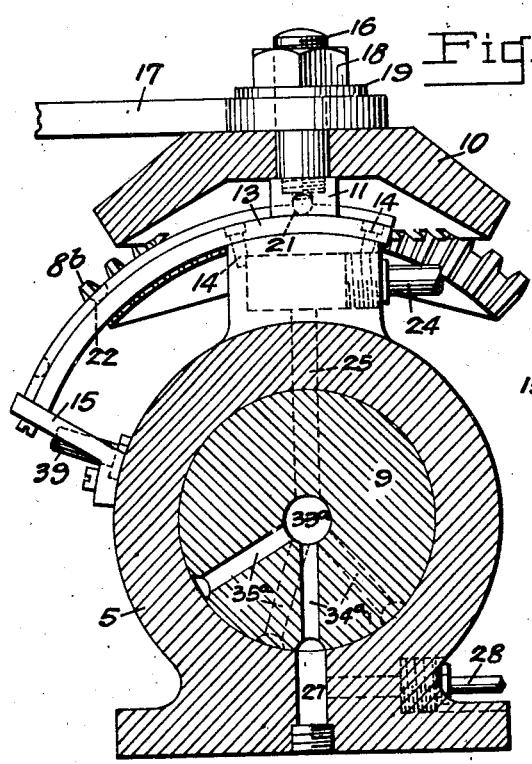
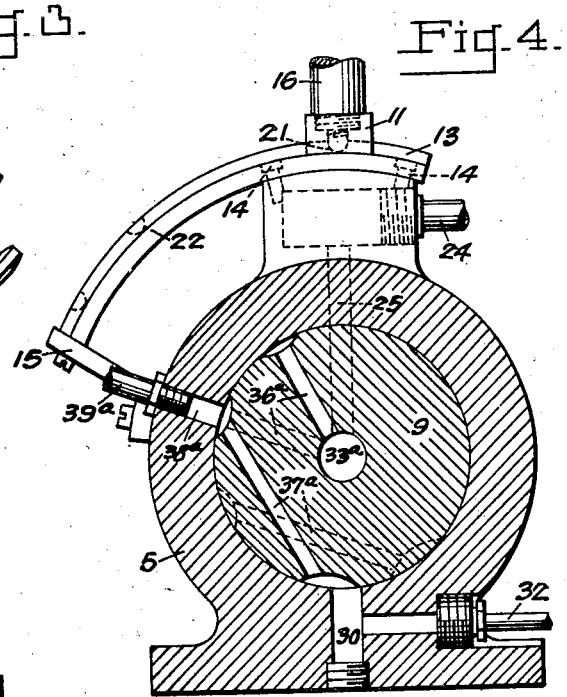
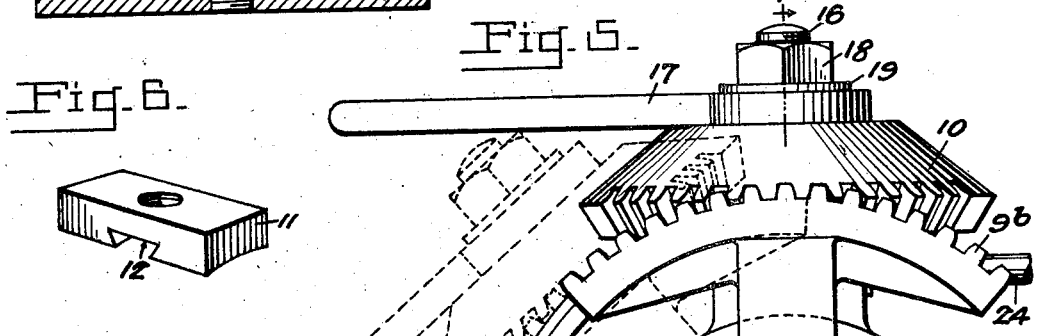
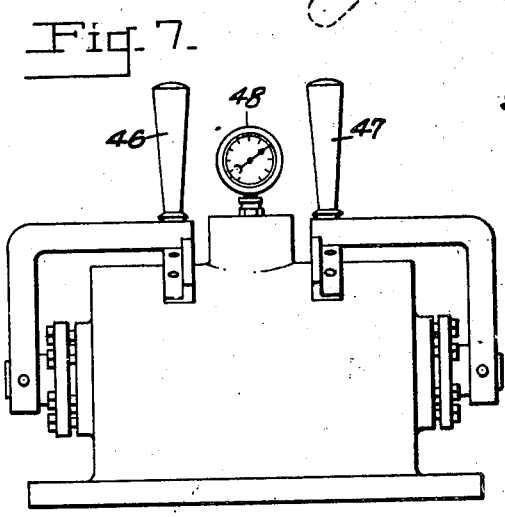
Inventors
Edward J. Alderman
Donald F. White
By G. J. Kessenich + J. H. Church
Attorneys Patented Oct. 13, 1942

2,298,267

UNITED STATES PATENT OFFICE 2,298,267

HYDRAULIC CONTROL MECHANISM

Edward J. Alderman, East Moline, and Donald F. White, Moline, Ill.

Application May 15, 1940, Serial No. 335,360

1 Claim. (Cl. 137—144)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to hydraulic control mechanism.

The purpose of the invention is to provide a simple and efficient hydraulic control mechanism which may be used, for example, in operating the steering mechanisms of a track-laying vehicle.

The specific nature of the invention as well as other objects and advantages thereof will clearly appear from a description of a preferred embodiment as shown in the accompanying drawings in which:

Figs. 3 and 4 are sectional views on the corresponding lines of Fig. 1;

Fig. 5 is a view in side elevation;

Fig. 6 is a perspective view of the carriage;

Fig. 7 is a view in front elevation of the casing with modified operating levers.

Figure 1:
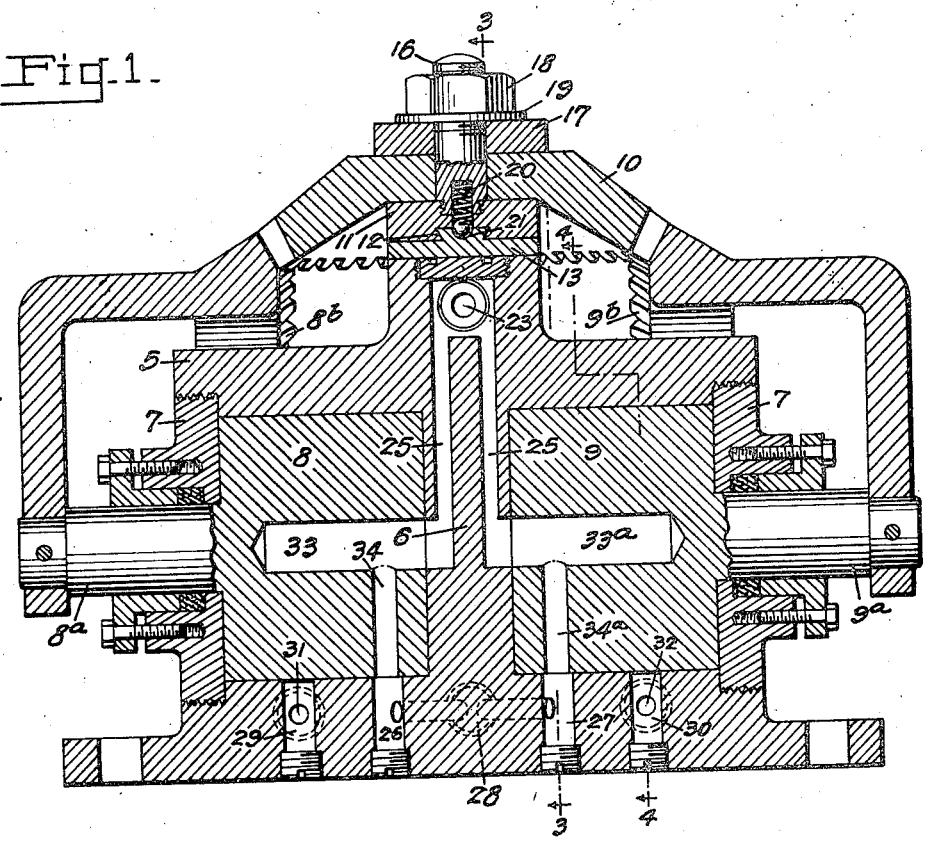
Fig. 1 is a longitudinal sectional view of the improved mechanism taken on the line 1—1 of Fig. 5.
Figure 2:
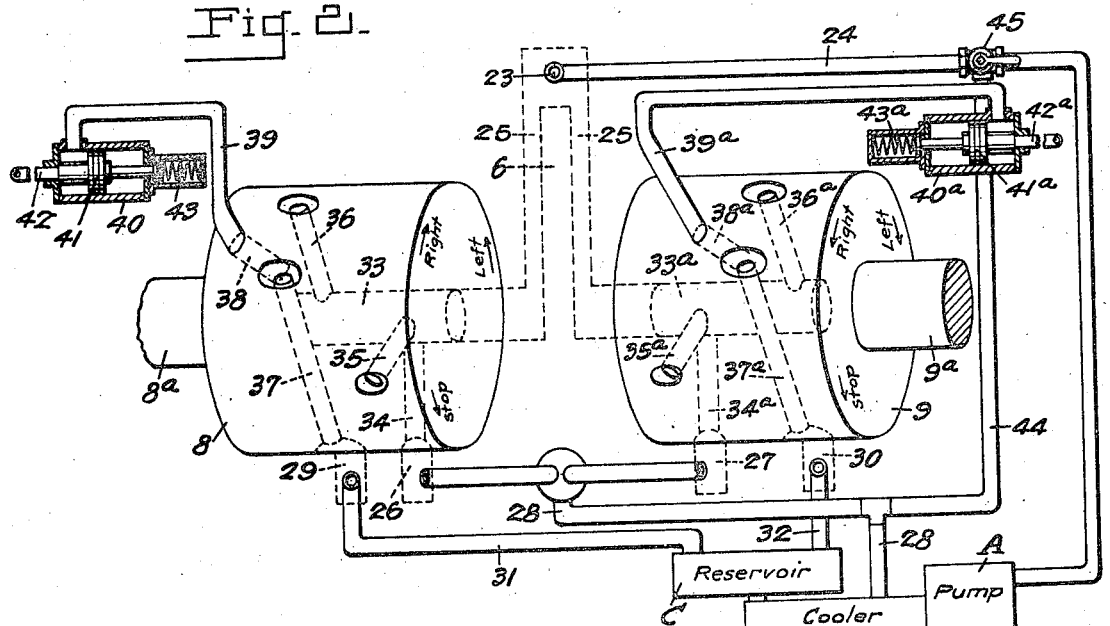
Fig. 2 is a schematic view of the entire system.

Referring to Figs. 1 to 5 there is shown a casing 5 having a central partition 6 and end plates 7—7. A left rotor 8 and a right rotor 9 are mounted within the casing on opposite sides of the partition and each includes a shaft, respectively 8a and 9a extending through the corresponding end plate. Segmental gears 8b and 9b respectively fixed to the shafts 8a and 9a are in mesh with a gear wheel 10.

The gear wheel is supported on a carriage 11 which has a tongue and groove connection 12 with an arcuate rail 13 fixed on the casing by screws 14 with its outer end fixed to a bracket 15. The gear wheel is retained on the carriage by means of a bolt 16 which also mounts an operating lever 17 that is retained by a nut 18. The nut acting through a washer 19 may serve to maintain the gear wheel and the operating lever in driving relation. A spring 20 housed in the inner end of the bolt urges a plunger against the rail where it is free to enter a recess 21, Fig. 1 or a recess 22, Fig. 4.

The casing is provided with an inlet 23 for a line 24 leading from a pump A which is adapted to circulate oil through the system about to be described. The inlet 23 is in communication with a pair of passages 25—25 in the partition. The lower part of the casing is provided with a pair of outlet passages 26 and 27 which lead to a common outlet line 28 connected to a cooler B. The casing is also provided with a pair of outlet passages 29 and 30 respectively connected by lines 31 and 32 with an oil reservoir C.

The left rotor 8 has an axial passage 33 closed at its outer end and open at its inner end to the inlet passage 25. The passage 33 communicates with a pair of angularly spaced radial passages 34 and 35 which are disposed in the plane of outlet passage 26 and also with a radial passage 36 disposed in the plane of outlet passage 29. A passage 37 substantially parallel to passage 35 and in the same plane is disposed on a chord of the rotor and is adapted, in one position of adjustment of the rotor, to establish communication between outlet passage 29 and a passage 38 in the casing which leads to a line 39 connected to a cylinder 40 of a unit that is to be controlled. This unit includes a piston 41 fixed to a piston rod 42 and a spring 43 for returning the piston after it has been displaced by oil from the line 39.

The parts from 33 to 43 inclusive are duplicated for the right rotor 9 and are designated by the suffix a. As viewed in Fig. 2 the passages in both the left and right rotors have identical positional relations.

The operation of the mechanism will be described in its relation to a tracklaying vehicle in which steering is accomplished by holding or retarding one of the tracks while the opposite track continues to be driven. When the vehicle is moving on a straight course the parts of the mechanism are in neutral position as shown in Figs. 1 to 5 so that the oil circulated by the pump flows through the passages 34 and 34a of the left and right rotors, through the corresponding passages 26 and 27 in the casing, and then to the common line 28 leading to the cooler.

In order to turn right the piston 41a of the right controlled unit is to be moved against the action of its spring to apply a brake to the power transmission which drives the right track of the vehicle. This is accomplished by turning the operating lever 17 to the left and through the gear wheel 10 rotating the gear segments 8b and 9b in opposite directions to impart a clockwise movement to the left rotor 8 and a counter-clockwise movement to the right rotor 9, as viewed in Figs. 1, 3 and 5. In this displacement, passage 34 of the left rotor moves to the left in Fig. 2 and passage 34a of the right rotor moves to the right, each movement interrupting communication with the line 28 to the cooler. The counter-clockwise movement of the right rotor 9 brings passage 36a into communication with the line 39a whereby oil is conducted to the cylinder 40a to actuate the piston 41a and apply the brake. In the clockwise movement of the left rotor the passages 36 and 37 are displaced but perform no function.

In order to turn left the operating lever 17 is turned to the right and produces a corresponding but opposite movement of the rotors.

When the operating lever is restored to neutral position after having been actuated to admit oil to a cylinder, the passage 37 will establish communication between the line 39 from the cylinder and the outlet 29 to the oil reservoir and permit the instant release of pressure from the cylinder and the oil lines. Consequently there will be a prompt response to the will of the operator in resuming a straight course after making a turn.

When it is desired to apply both brakes simultaneously the lever 17 is moved downwardly on an arc to the position indicated in dotted lines in Fig. 5. By virtue of the connection between the gear wheel and the segments the left and right rotors will both be moved into position to admit oil into the cylinders.

In order to lock both brakes the lever 17 is depressed an additional amount into engagement with the bracket 15. The passages 36 and 36a of the rotors are now moved a sufficient distance to interrupt communication with the lines 39 and 39a and lock the pressure fluid in the cylinders. However passages 35 and 35a are now in communication with the line 28 to permit free circulation of the remainder of the oil in the system.

A cut-off line 44 is preferably included between the inlet 23 and outlet 28 and includes a conventional valve indicated at 45 which is opened when the hydraulic control is to be inoperative and manual control is to be exercised by the usual mechanisms (not shown).

In the modification shown in Fig. 7 the controls 46 and 47 for the left and right rotors are independently operated. A pressure gauge 48, provided in either instance, is shown herein.

We claim:

In a control mechanism, a casing having a central fluid inlet and having in each half a first and second outlet and a third outlet for a controlled unit, a pair of similar rotors one in each half of the casing, each rotor having an axial passage constantly in communication with the inlet, a pair of radial passages in the same plane leading from the axial passage and adapted to selectively establish communication with the first outlet, a single radial passage leading from the axial passage and adapted to establish communication with the third outlet when the pair of radial passages are out of communication with the first outlet, a chordal passage in the plane of the single radial passage for establishing communication between the third outlet and the second outlet when one of the pair of radial passages is in communication with the first outlet, the other of said pair of radial passages being adapted to register with said first outlet when both said single radial passage and chordal passage are out of register with the third outlet, a gear segment fixed on the outer side of each rotor, arcuate track means on said casing, a gear wheel meshing with the gear segment of each rotor, attaching means between the gear wheel and the arcuate track adapted to slide thereon, said gear wheel being rotatable on said attaching means, and indexing means between said attaching means and said track.

EDWARD J. ALDERMAN.
DONALD F. WHITE.